Patented Nov. 25, 1941

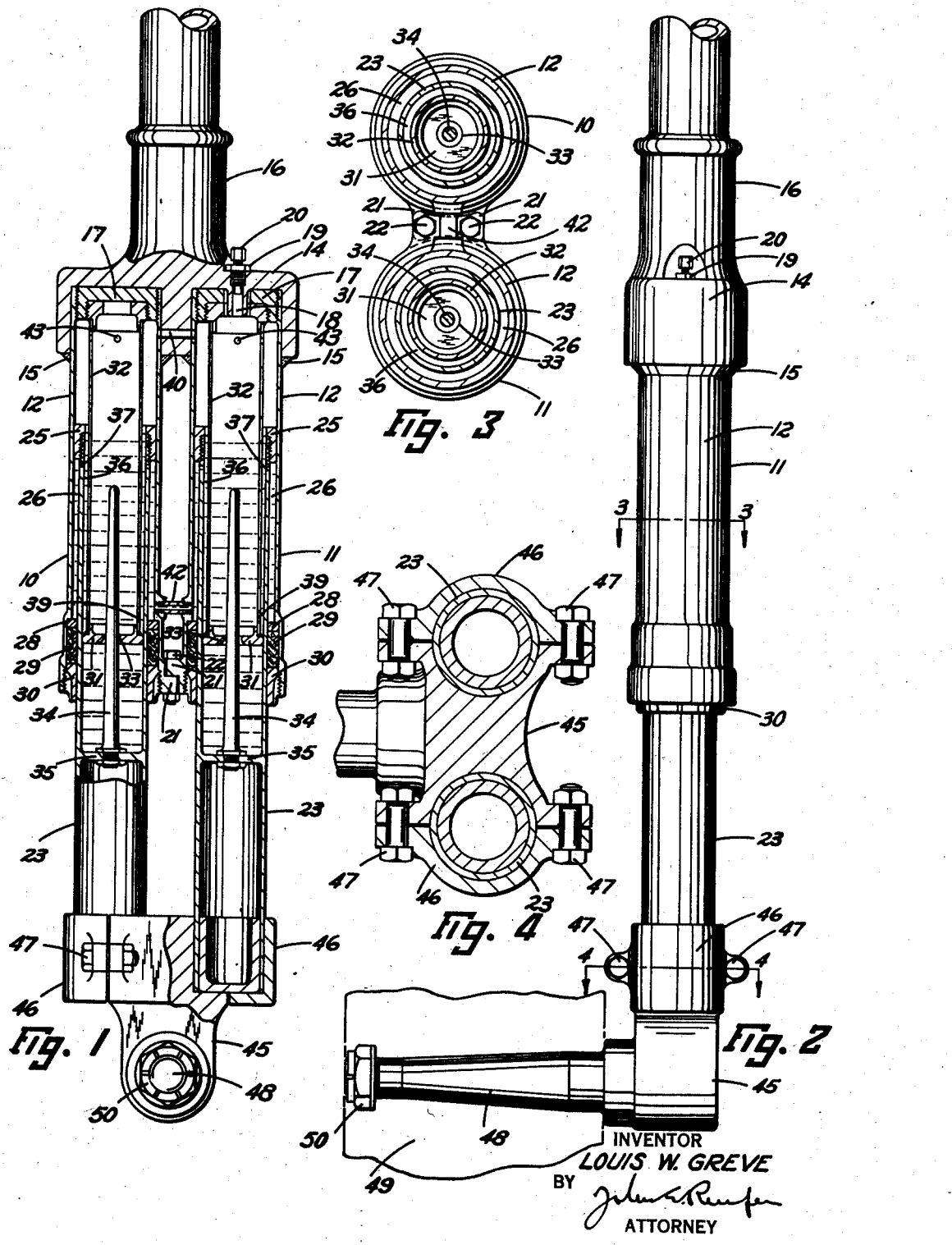

2,263,770

UNITED STATES PATENT OFFICE 2,263,770

LANDING WHEEL MOUNTING FOR AIRCRAFT

Louis William Greve, Cleveland, Ohio, assignor to The Cleveland Pneumatic Tool Company, Cleveland, Ohio, a corporation of Ohio Application January 23, 1939, Serial No. 252,261

4 Claims. (Cl. 244—104)

This invention relates broadly to aircraft, but more particularly to improvements in landing gears including shock absorbing means designed primarily for checking or cushioning the shocks of landing and taxiing.

One object of this invention is to produce a landing wheel support including shock absorbing means arranged and disposed in a manner preventing horizontal rotation of the wheel.

Another object of this invention is to produce an improved landing wheel support including a pair of shock absorbing units mounted on the craft in a manner affording minimum frontal air resistance.

Another object of this invention is to produce an improved landing gear including a plurality of interconnected shock absorbing struts working in unison and forming a compact assembly which is strong, durable and efficient.

Other objects and advantages more or less ancillary to the foregoing reside in the specific construction and aggroupment of the elements peculiar to this structure, as will become apparent from a more complete examination of this specification.

In the drawing, which illustrates a preferred form of the invention;

Fig. 1 is a side elevational view partly in section of a landing wheel support embodying the invention.

Fig. 2 is a front elevational view of the wheel support shown in Fig. 1.

Fig. 3 is an enlarged cross sectional view taken in a plane indicated by line 3—3 in Fig. 2.

Fig. 4 is an enlarged cross sectional view taken in a plane indicated by line 4—4 in Fig. 2.

Referring to the drawing, and more particularly to Fig. 1, the improved landing wheel support comprises two oleo shock absorbing units generally designated by 10 and 11, each including an upper cylinder 12 united by a head 14 rigidly secured thereon by any suitable means such as welds 15.

Formed integrally with the head 14, there is an extension or stanchion 16 for rigid or pivotal attachment of the support to the craft. The stanchion 16 together with the two oleo shock absorbing units 10 and 11 in effect form a single cantilever leg carrying a ground engaging member as will be hereinafter explained. The two cylinders 12 have their upper ends normally closed by a plug 17, while one of the cylinders is formed with a port 18 extending through the head 17 and closed by a plug 19 and air valve 20. Near their lower ends, the cylinders 12 are formed with laterally extending overlapping lugs 21, located between the cylinders, and clamped together by bolts 22.

In practice, the cylinders 12 are mounted within the head 14, one beside the other, that is in juxtaposed relation and in perfect parallel alignment, and constitutes with the head 14, a casing having two parallel cylindrical chambers formed by the interior of the cylinders. Slidable within each cylinder, there is a lower cylinder or piston tube 23, each tube having mounted on its upper end a head 25 in slidable engagement with the inner wall of its respective upper cylinder. Between each cylinder 12 and tube 23, there is a space or chamber 26, while the lower end of each cylinder 12 is counterbored to accommodate a sliding bearing 28, packing rings 29, and a gland nut 30.

Located within each piston tube 23, there is a piston 31 carried by the lower end of an inner tube 32, which tube is affixed at its upper end to the closed end 17 of its respective upper cylinder. The piston 31 is formed with a central orifice 33 having slidable therethrough a metering pin 34 carried by a partition 35 formed intermittent the ends of the piston tube. The piston 33 is of larger diameter than the inner tube 32, thereby providing a clearance, or chamber 36 between the inner tube and its respective piston tube, which chamber is in communication with the chamber 26 through a port 37 extending through the wall of the piston tube 23 adjacent the upper end thereof. Near its lower end, each inner tube 32 has a port 39 extending through the wall thereof above the piston 31. The cylinders 12 are interconnected by a passage 40 located near the upper end thereof and extending partway through the head 14, while the lower end portions of the cylinders 12 are interconnected by a short conduit 42. Near its upper end, each inner tube 32 is also provided with one or more ports 43, the purpose of which will be explained later.

Between the lower ends of the tubes 23, there is a spacer 45 clamped to the tubes by caps 46 and bolts 47. The spacer is accurately machined to maintain each piston tube 23 in exact coaxial alignment with its respective cylinder 12, thereby enabling normal free telescopic movement of the tubes within the cylinders. Preferably formed as an integral part of the spacer 25, there is an axle 48 adapted to rotatably receive a landing wheel 49 held in position by a nut 50, which axle extends laterally from the piston tubes as clearly shown in Fig. 2.

When installing the improved landing wheel support or cantilever leg on the craft, the stanchion 16 is secured to the fuselage of the craft either rigidly or by a pivotal connection enabling retraction of the leg during flight, and in a manner causing the two oleo shock absorbing units 10 and 11 to be located within one vertical plane parallel to the direction of motion of the craft, and consequently with the two units located side by side in a fore to aft direction. In this manner, the wheel 49 is positioned for rotation within a vertical plane parallel to the direction of motion of the craft. With this improved wheel support mounted sidewise of the craft, it will be understood that its frontal wind resistance is materially less than that of a similar wheel support mounted broadwise of the craft. In order to maintain this wind resistance to a minimum, the base diameter of the cylindrical stanchion 16 is preferably made equal to or smaller than the larger diameter of the strut.

After the wheel support has been installed as above described, the plug 19 and air valve 20 are removed and liquid poured into the cylinder 12 formed with the port 18. From this cylinder, the liquid will flow into the other cylinder 12 via the short conduit 42. When the liquid in the two cylinders 12 has reached a predetermined level, which will be the same in both cylinders, the plug 19 and air valve 20 are again screwed in position and compressed air admitted into the cylinders through the air valve 20. In this instance, compressed air will flow from one to the other cylinder 12 via the passage 40. When the air in the cylinders 12 has reached a predetermined pressure, which pressure will be equal in both cylinders, the assembly will be ready for operation.

When landing, the compression stroke of the shock absorbers will be checked by the compressed air within the upper ends of the cylinders 12 and by the displacement of the liquid from the tubes 23 into the cylinders 12 via the piston orifices 33, which orifices are controlled by the metering pins 34. Subsequently the recoil stroke or expansion of the shock absorbers will be checked by the displacement of the liquid from the chambers 36 into the tubes 32 via the restricted ports 39. Since the operation of the shock absorbing units above described is substantially the same as that of similar shock absorbers well known in the art, no further description of same is thought necessary other than pointing out that in the dual assembly, the two units have been arranged and disposed in a manner affording their unisonal operation.

To prevent the head or connection 14 between the upper ends of the cylinders 12 from being subjected to an excessive thrust resulting from the compression of the shock absorbers, the space between the two shock absorbers has been reduced sufficiently to position the stanchion 16 at least part way vertically over the cylinders 12, thereby reducing the eccentricity between the line of thrust of the cylinders and the stanchion 16, and enabling the head 14 to be made lighter without danger of deflection.

In the dual construction above described, it will also be understood that by rigidly connecting the two shock absorbers 10 and 11 at their upper ends by the head 14 and at the lower ends by the spacer 45, relative rotation of the cylinders is prevented, thereby resulting in a construction wherein the disposition of the several cylinders actually prevents horizontal rotation of the wheel 49 without necessitating additional mechanism such as pivotally interconnected torque arms, splines, or the like, heretofore used in shock absorbing struts subjected to torsional strains.

Although the foregoing description is necessarily of a detailed character, in order to completely set forth the invention, it is to be understood that the specific terminology is not intended to be restrictive or confining and it is to be further understood that various rearrangements of parts and modifications of structural detail may be resorted to without departing from the scope or spirit of the invention as herein claimed.

I claim:

1. A cantilever-type airplane landing gear, comprising a pair of oleo shock absorbing struts mounted side by side in a fore to aft direction, each strut including upper and lower telescoping cylinders, rigid connections between said struts one between the upper and the other between the lower cylinders thereof, a single upright connecting said struts to the airplane, the lateral extent of said upright relative to the airplane being equal to or smaller than the larger diameter of said cylinders, said upright being located at least part way vertically over said struts, and a landing wheel operatively carried by the lower end portions of said struts.

2. In a shock absorber for aircraft, a pair of laterally spaced cylinders, a piston tube for each cylinder telescopically mounted therein and extending through one end thereof, a rigid laterally extending connection between the ends of said cylinders and between the extending ends of said piston tubes, a craft connecting cylindrical stanchion extending upwardly from the connection between said cylinders, said stanchion being of a diameter equal to or smaller than the larger diameters of said cylinders and located at least part way vertically over each cylinder, and a wheel carrying axle carried by the other connection, said axle being equally spaced from said piston tubes.

3. In a landing gear for aircraft, a pair of laterally spaced upper and lower telescoping cylinders, a rigid connection between the upper ends of the upper cylinders including a cylindrical stanchion for attachment of the upper cylinders to the craft, said stanchion being of a diameter equal to or smaller than the larger diameters of said cylinders, said upper cylinders being spaced an extent smaller than the base diameter of said stanchion, a rigid connection between the lower ends of the lower cylinders, and a landing wheel receiving axle carried by said last connection vertically below the space between said cylinders.

4. A cantilever-type aircraft landing gear, comprising a pair of oleo shock absorbing struts mounted side by side in a fore to aft direction relative to the craft, upper and lower rigid connections fitted over the ends of said struts for preventing relative movement therebetween, the center axis of said stanchion being located within a vertical plane passing through the center axes of said struts and being spaced equally therefrom, the extent of said stanchion perpendicularly relative to said vertical plane being equal to or smaller than the larger diameter of said strut, said stanchion being located at least part way vertically over each cylinder, and a wheel axle carried by said lower connection.

LOUIS WILLIAM GREVE.